A. H. ROBINSON.
JOINT COUPLING.
APPLICATION FILED SEPT. 12, 1919.
1,359,621. Patented Nov. 23, 1920.
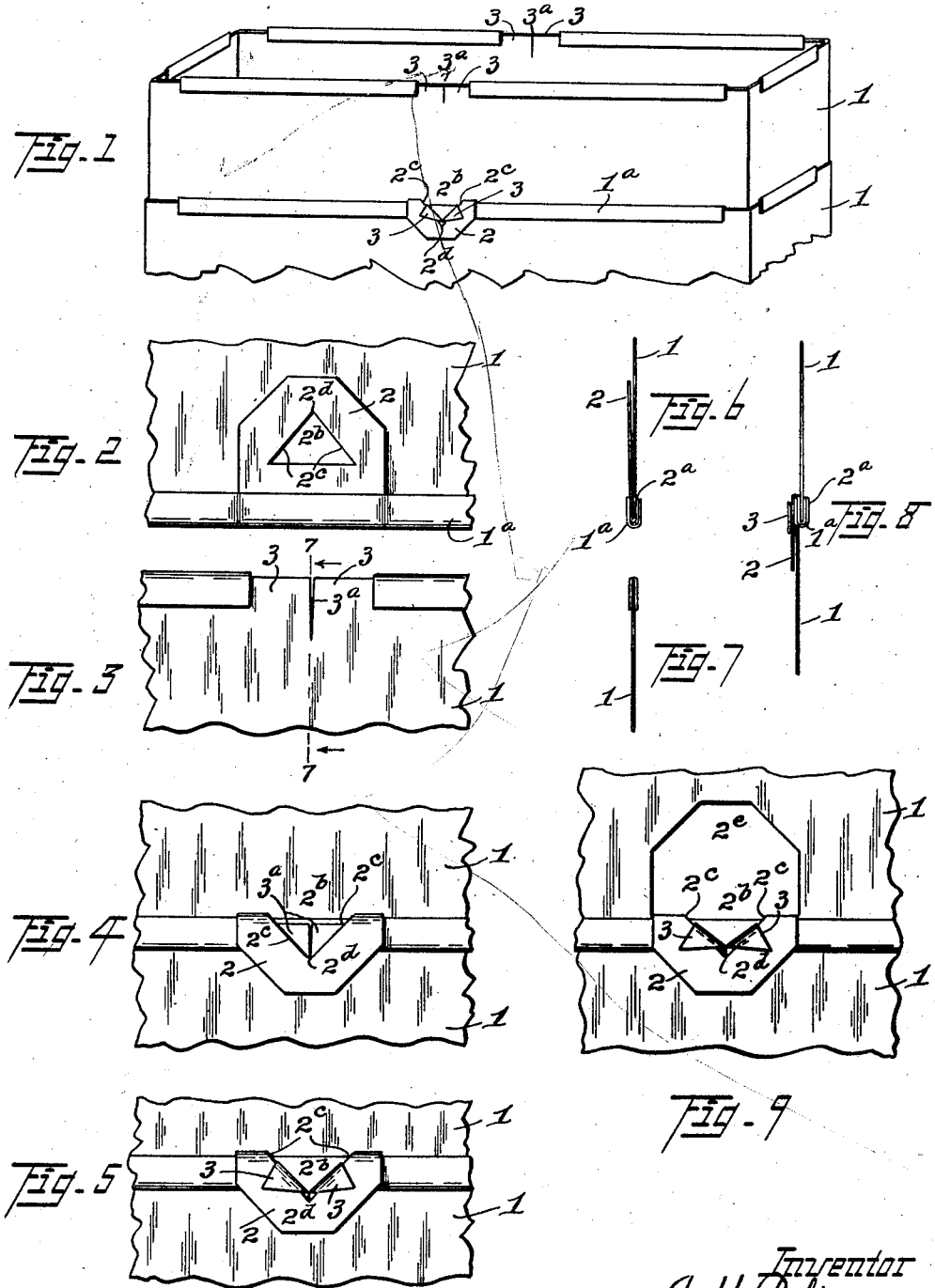

UNITED STATES PATENT OFFICE.

ARTHUR H. ROBINSON, OF CLEVELAND, OHIO.

JOINT-COUPLING.

1,359,621.  Specification of Letters Patent.  Patented Nov. 23, 1920.

Application filed September 12, 1919. Serial No. 323,352.

*To all whom it may concern:*

Be it known that I, ARTHUR H. ROBINSON, a citizen of the United States, residing at Cleveland, in the county of Cuyahoga and State of Ohio, have invented certain new and useful Improvements in Joint-Couplings, of which the following is a specification.

My invention relates to improvements in joint couplings, and more particularly to that class of or type which are designed and adapted for connecting and locking the adjacent or jointed ends of conduit or pipe members whereby when said pipe members or sections are connected together the same will be securely retained and locked in position to prevent the accidental loosening or opening of the joints The primary object of the invention is to provide a generally improved coupling of this class which will be exceedingly simple in construction, cheap of manufacture and efficient in use.

A further object is the provision of a combined coupling and lock which may be readily attached to or embodied in conduit members or sections of varying forms and types.

While I have shown my improved coupling in connection with the jointed sections of a conduit of the specific form of a hot air conduit, it will be apparent and should be understood that the invention may be readily incorporated in and used in connection with various forms of conduit or pipe sections.

With the above mentioned and other ends in view, my invention consists in the novel construction, arrangement and combination of parts, hereinafter described, illustrated in some of its embodiments in the accompanying drawings, and particularly pointed out in the appended claims.

Referring to the drawings, forming a part of this specification, Figure 1, is a perspective view of two connected conduit sections of the hot air type equipped with my improved joint coupling.

Fig. 2. an enlarged view of the open or tab coupling member before being bent down to be engaged by the split or tongue coupling member of the adjacent conduit section.

Fig. 3, a similar view of the split or tongue coupling portion of the adjacent conduit section before being bent out to engage and lock with the open or tab coupling member.

Fig. 4, a view of the coupling member after the tab coupling member is bent downwardly to receive the split coupling member and prior to the initial bending out of the latter.

Fig. 5, a view of the coupling members in complete connected and locked position.

Fig. 6, an edge view of the open or tab coupling member before being bent downwardly and as shown in Fig. 2.

Fig 7, a cross sectional view of the split or tongue coupling section taken on line 7—7 of Fig. 3.

Fig. 8, an edge view of the coupled sections, as indicated in Fig. 5, of the drawings.

Fig. 9, a front elevation of a modified form of coupling in which the tab coupling member is formed integral with the conduit section by being struck out from the walls thereof, instead of as an attachment, as shown in the other figures of the drawings.

Similar numerals of reference designate like parts throughout all the figures of the drawings.

In the present embodiment of my invention I have shown the same attached to the sections of a conduit of the hot air type, such as the wall conduits used in connection with hot air furnaces.

When used in connection with a hot air conduit having inner and outer walls the edge of one of the conduit sections 1, is preferably provided with a beaded portion $1^a$, and in such construction a tab coupling member 2, is provided. The tab member or section 2. is preferably formed of sheet metal and may be secured to the edge of the conduit section 1, in any suitable and convenient manner, in the present instance,—by forming an opening in the beaded portion $1^a$, and bending a part $2^a$, beneath the edge of the section 1, as shown most clearly in Figs. 2 and 6, of the drawings.

The tab 2, is bent upwardly to normally extend substantially parallel with the face of the conduit. The tab 2, is of sufficient length and when the conduit section to which it is attached is fitted within the end of another section and is folded downwardly the same will overlap the edges of the other conduit section.

As a means of coupling and locking the tab to the adjacent conduit section, the tab 2, is provided with a triangular-shaped opening $2^b$, one of the sides of the triangular-shaped opening being substantially parallel with the base portion of the tab and the other or remaining two sides $2^c$, converging toward each other and terminating at the median portion $2^d$, of the tab.

As a means of connecting the tab coupling member to the adjacent conduit section the upper marginal edge of the latter, or rather the overlapping adjacent edge of the adjacent conduit section, is provided with a split coupling portion or section, the median split portion $3^a$, forming adjacent triangular shaped sections or tongues 3, adapted, when the tab section 2, is folded thereover, as shown in Fig. 4, to rest immediately beneath the triangular-shaped opening $2^b$, so that the tongues 3, may be bent outwardly and downwardly over the triangular-shaped converging sides $2^c$, as shown in Fig. 5, of the drawings, thereby securely locking the coupling members 2 and 3, in position.

Where practical to do so, for example,— when the conduit is provided with inner and outer walls or when no particular damage may result from forming an opening in the outer wall of the conduit section the tab coupling member 2, may be struck out from the metal itself leaving an opening $2^e$, as shown in Fig. 9, of the drawings, thereby saving material and simplifying the use of the coupling.

From the foregoing description, taken in connection with the accompanying drawings, the construction, objects and advantages of my invention will be readily understood.

Having thus described some of the embodiments of my invention, without having attempted to set forth all the forms in which it may be made or all the modes of its use, what I claim and desire to secure by Letters Patent, is,—

1. A joint coupling, comprising a bendable tab member provided with a triangular opening and subjacent triangular-shaped tongues bent outwardly through said triangular opening and interlocking therewith.

2. A joint coupling, comprising a tab coupling member provided with an opening having converging sides, and triangular tongues beneath said tab member extending through said opening and engaging said converging sides.

3. A joint coupling, comprising a coupling tab member provided with a triangular shaped opening and a second coupling member comprising triangular-shaped tongues bent outwardly from each other through said opening and interlocking with said coupling member.

4. In a lock coupling for jointed conduit members, a coupling tab on one member having a triangular opening extending over the jointed edges of the other, the latter being provided with a split portion forming subjacent triangular tongues extending outwardly through said opening and folded over two of the triangular shaped sides thereof to interlock therewith.

5. In a lock coupling for jointed conduit members, a bendable coupling tab on one member having a tapered opening adapted to be bent down over the marginal edges of the other, the latter being provided with subjacent tongues normally meeting at the center of said opening and adapted to be folded over two of the tapered sides thereof to interlock therewith.

6. The combination with a pair of jointed conduits, of a coupling tab bent beneath the edge of one member and upwardly and outwardly and thence downwardly over the adjacent edge of the other member, said tab being provided with a triangular opening, and said adjacent conduit edge being provided with a median split portion forming oppositely arranged triangular shaped tongues adapted to be bent outwardly over the triangular sides of said triangular opening and interlock therewith.

7. In a coupling for jointed conduit members, the combination with one of said conduit members; of a coupling tab adapted to be bent outwardly and downwardly over the marginal edge of an adjacent conduit member, said tab being provided with a triangular shaped opening presenting a V-shaped portion over said marginal edge, the latter being provided with slit tongues adapted to be bent outwardly and downwardly through said opening and over the edges of said tab to interlock with the latter.

8. In a coupling for jointed conduit members, the combination with one of said conduit members; of a coupling tab on the edge of one member adapted to be bent downwardly over the superposed edge of an adjacent conduit member, said tab being provided with an opening presenting a depending V-shaped portion over the subjacent edge of the other conduit member, the marginal edge of the latter being split beneath the apex of said V-shaped portion forming tongues bent outwardly and downwardly through said V-shaped portion and over the edges of said tab.

In testimony whereof I have affixed my signature.

ARTHUR H. ROBINSON.